Feb. 13, 1945.  D. C. PRINCE  2,369,175
EXHAUST GAS OPERATED TURBINE ARRANGEMENT
Filed March 1, 1943
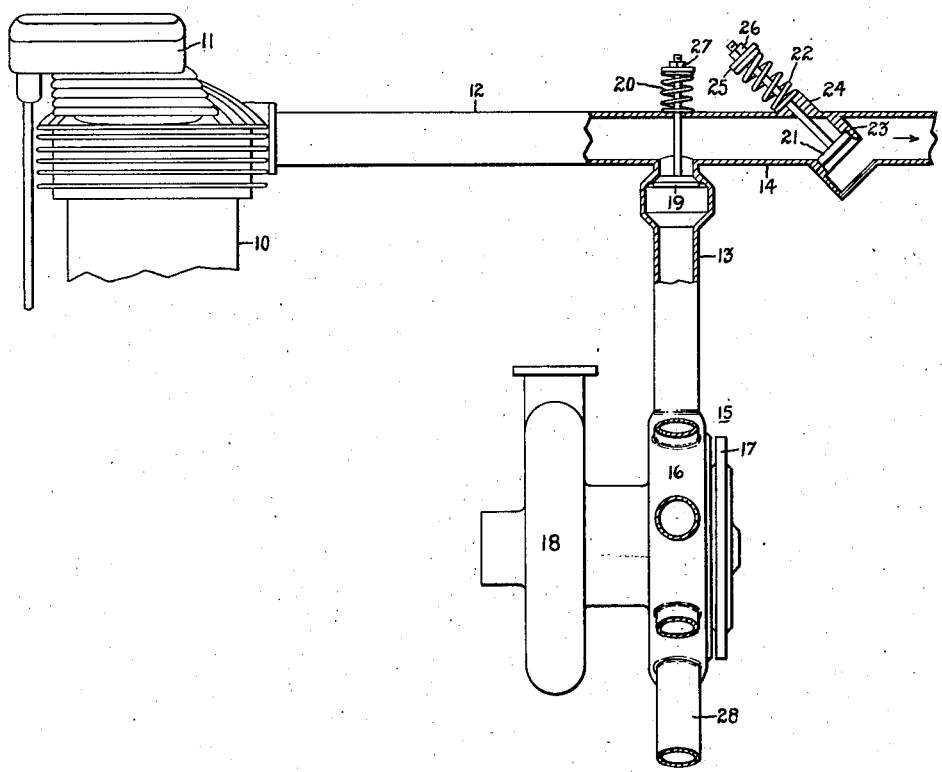
Inventor:
David C. Prince,
by Harry E. Dunham
His Attorney.

UNITED STATES PATENT OFFICE 2,369,175

EXHAUST GAS OPERATED TURBINE ARRANGEMENT

David C. Prince, Schenectady, N. Y., assignor to General Electric Company, a corporation of New York Application March 1, 1943, Serial No. 477,513

1 Claim. (Cl. 60—13)

The present invention relates to exhaust gas operated turbine arrangements in which a gas turbine is associated with a combustion engine and operated by gases exhausted from the engine. Such arrangements are used, for example, on aircraft in which the mechanical output of the gas turbine may be utilized for operating a supercharger for the engine or a passenger cabin. In some instances the mechanical load output of the turbine is transmitted through the engine crank shaft to a propeller. In the usual arrangement of this kind gases discharged from the engine are admitted to the gas turbine during the entire period of the engine exhaust stroke. This raises the engine exhaust or back pressure which is undesirable, especially during operation of an aircraft at low altitude. In order to reduce the building up of the exhaust or back pressure it has hereinfore been suggested to provide the combustion engine with two consecutively operated exhaust valves and to connect the valve which is opened first during the exhaust stroke to the gas turbine and the valve which is opened second during the exhaust stroke to the atmosphere. In an arrangement of this kind only the gases exhausted during the first part of the exhaust stroke of the engine are utilized for operating the gas turbine. These arrangements, however, require special engine construction in that they necessitate two exhaust valves for each cylinder head.

The object of my invention is the provision of an improved construction and arrangement of exhaust gas operated turbine arrangements whereby the aforementioned drawbacks are overcome without requiring special engine construction. This is accomplished in accordance with my invention by the provision of a valved conduit for each engine cylinder connected to receive the exhaust gases therefrom during the entire exhaust stroke and to conduct the gases during the first part of the exhaust stroke to a gas turbine and during the second part of the exhaust stroke to atmosphere. In a preferred embodiment such valved conduit includes two spring-biased non-return valves, one for admitting gases to the turbine during the first part of the stroke and a second valve for discharging gases into the atmosphere during the second part of the exhaust stroke.

For a better understanding of what I believe to be novel and my invention, attention is directed to the following description and the claim appended thereto in connection with the accompanying drawing.

The single figure of the drawing illustrates diagrammatically an embodiment of my invention.

The arrangement comprises a combustion engine of which I have shown only one cylinder 10 with a head 11 including the usual standard or conventional valve mechanism for admitting fuel to the engine and discharging exhaust gases therefrom. By a "standard or conventional valve mechanism" I mean one that includes only a single exhaust valve or a multiplicity of valves operating simultaneously. The exhaust gases during the entire exhaust stroke are admitted into a conduit 12 which has two branches 13 and 14 connected to a turbine 15 and to atmosphere respectively. The turbine 15 has a nozzle box 16 connected to the branch conduit 13 and arranged to direct gases to a bucket wheel 17 which in the present examples is secured to a shaft for driving a compressor 18. The flow of gases into the branched conduit 13 is controlled by a non-return valve 19 biased towards closing position by a comparatively light spring 20. The discharge of gases from the branch conduit 14 to atmosphere is controlled by a valve 21 normally biased into closing position by a comparatively heavy spring 22. During operation both valves 19 and 21 are forced towards open position by pressure of the exhaust gases discharged during the first part of the exhaust stroke. The valve 21, however, being biased towards closing position by a heavier spring than the valve 19, will be opened more slowly than the valve 19. The valve 19 is opened at the beginning of the first part of the exhaust stroke and the valve 21 is opened at the end of the first part of the exhaust stroke, that is, at the beginning of the second part of the exhaust stroke. Therefore the exhaust gases during the first part of the exhaust stroke will be conducted to the nozzle box 16. Upon opening of the valve 21 the pressure in the conduit 12 is reduced, thus permitting closing of the valve 19 and discharge of the gases during the latter part of the exhaust stroke to atmosphere. The opening of the valve 21 in the present arrangement is further retarded by the provision of a cylindrical skirt 23 around the valve, necessitating a certain valve movement before opening of the valve 21 takes place. In contrast, the valve 19 begins to open upon the slightest movement thereof. The cylindrical skirt 23 at its upper end is united with or sealed to the branch conduit 14 and at its lower end forms an opening or port to the outlet of the branch conduit 14. The edge of the port near the valve 21 is spaced from the latter when the valve is in closing position. Therefore the valve 21 must travel a certain distance requiring a certain period of time before gases are discharged to atmosphere. This period of time to effect opening of the valve 21 may be varied by changing the compression of the spring 22 and the mass of the valve. The greater this compression and the heavier the valve, the more time is needed to effect opening of the valve 21. In the present example the lower end of the spring 22 is seated on a boss 24 formed on the branch conduit 14 and the upper end of the spring 22 is engaged by a washer 25 bearing against an adjustable nut 26 screwed onto the valve stem.

The spring 20 for the check valve 19 may likewise be adjusted by means of a nut 27 screwed onto the upper end of the stem of the valve 19. Thus, by adjustment of the valve springs 20 and 22 the relation between the first and second parts of the exhaust stroke may be varied, or, from another viewpoint, the period of admitting gases to the turbine may be lengthened and the period during which gases are discharged to the atmosphere may be shortened and vice versa.

As pointed out above, the valve 19 is open during the beginning of the exhaust stroke and the valve 21 is opened a predetermined time after opening of the valve 19. Opening of the valve 21 causes a rapid drop in pressure in the conduit 12 resulting in closing of the valve 19 by action of the spring 20 and the higher pressure on the discharge side of the valve 19. The valve 21 remains open until the pressure in the conduit 12 has dropped to a predetermined low value whereupon the valve 21 is closed by action of its biasing spring 20 against the pressure on the inlet side of the valve 21. However, due to the mass of valve 21 this closing is delayed long enough to permit complete emptying of the cylinder.

The nozzle box 16 has a plurality of other inlet conduits 28 corresponding to the branch conduit 13 for connection to other cylinders of the same combustion engine in the manner described above with reference to the connection between the branch conduit 13 and the cylinder 10. Each conduit 13 and 28 may be connected to a separate chamber of the nozzle box 16 to admit gases to separate arcs of the bucket wheel 17 as is customary in partial admission turbines.

What I claim as new and desire to secure by Letters Patent of the United States is:

Exhaust gas operated turbine arrangement comprising an internal combustion engine having a cylinder, a gas turbine having a nozzle box, a single conduit connected to receive combustion gases from the engine during the entire period of the engine exhaust stroke, means including separate spring-biased check valves for connecting the conduit to the nozzle box and the atmosphere respectively, the valve controlling the flow of gases from the conduit to atmosphere having a disk and a cylindrical skirt surrounding the disk and forming a discharge port spaced from the disk with the valve in closed position to permit opening of said valve only after the other valve has been opened for a predetermined period of time.

DAVID C. PRINCE.